(12) United States Patent
Williams

(10) Patent No.: US 6,948,641 B1
(45) Date of Patent: Sep. 27, 2005

(54) MEASURING AND DISPENSING APPARATUS

(76) Inventor: Jeffrey S. Williams, P.O. Box 131722, Carlsbad, CA (US) 92013

( * ) Notice: Subject to any disclaimer, the term of this patent is extended or adjusted under 35 U.S.C. 154(b) by 0 days.

(21) Appl. No.: 11/022,745

(22) Filed: Dec. 28, 2004

(51) Int. Cl.⁷ .............................................. B67D 3/00
(52) U.S. Cl. ...................... 222/456; 222/480; 222/548; 222/48
(58) Field of Search .......................... 222/48, 480, 548, 222/456

(56) References Cited

U.S. PATENT DOCUMENTS

| 3,311,264 | A |   | 3/1967  | Cayer |
|-----------|---|---|---------|-------|
| 4,346,823 | A |   | 8/1982  | Eppenbach |
| D292,676  | S |   | 11/1987 | Mileto |
| 4,893,729 | A | * | 1/1990  | Iggulden et al. .............. 222/48 |
| 4,961,521 | A |   | 10/1990 | Eckman |
| 5,509,582 | A |   | 4/1996  | Robbins |
| 5,601,213 | A |   | 2/1997  | Daniello |

\* cited by examiner

*Primary Examiner*—Philippe Derakshani

(57) ABSTRACT

A measuring dispenser for dispensing a dry material from its storage container in accurate, predetermined amounts comprises a housing with a partition wall dividing the housing into top and bottom portions. A plurality of radial walls defines a plurality of cavities in the top portion. Each of the cavities has top and bottom openings. A cover member is rotatably coupled to the housing and selectively covers each of the top openings. The cover member has a dispensing hole that extends therethrough. A disc is rotationally coupled to the housing and has a filling hole extending therethrough. A collar is attached to the disk and is designed for releasably attaching the dispenser to the open top end of the container. Material enters the cavities and is selectively dispensed through the dispensing hole in the cover member.

19 Claims, 5 Drawing Sheets

MEASURING AND DISPENSING APPARATUS

BACKGROUND OF THE INVENTION

1. Field of the Invention

The present invention relates to dispensers and more particularly pertains to a new dispenser for dispensing a dry material from its storage container in accurate, predetermined amounts.

2. Description of the Prior Art

The use of dispensers is known in the prior art. U.S. Pat. No. 4,346,823 describes a multiple function closure for attachment to a container for divided material which provides a multiple-function closure that enables the user to select among closed and several different open positions. Another type of dispenser is U.S. Pat. No. 5,509,582 consisting of a cap adapted for attachment to a conventional container with a weir aperture and an internal configuration that allows measured amounts of contents from the container to be dispensed without concern that additional amounts will be transferred inadvertently. U.S. Pat. No. 4,961,521 details an adjustable metering dispenser having a multiplicity of parts including the container for holding the material to be dispensed.

While these devices fulfill their respective, particular objectives and requirements, the need remains for a device that permits dispensing material from within the container in predetermined amounts in a single operation.

SUMMARY OF THE INVENTION

The present invention generally comprises a measuring and dispensing apparatus for distributing measured amounts of a material from a container with a threaded open top end to which the apparatus may be removably attached. The apparatus comprises a cylindrical housing with a top wall, a bottom wall, and a peripheral wall that is attached to and extends between the top and bottom walls. A partition wall is positioned between the top and bottom walls for dividing the housing into a top portion and a bottom portion. A plurality of radial walls is attached to and extends between the top wall and the partition wall so that a plurality of cavities is defined in the top portion. Each of the cavities extends upwardly through the top wall and downwardly through the partition wall so that a plurality of top openings and bottom openings is defined. A cover member is rotatably coupled to the top wall of the housing and covers each of the top openings. The cover member has a dispensing hole extending therethrough. Included is a disc with a peripheral edge. An upwardly extending lip is attached to and extends along the peripheral edge. The upwardly extending lip has an outer edge with an inwardly extending peripheral flange attached thereto. The peripheral flange is positioned within a peripheral groove in the housing such that the disc is rotationally coupled to the housing. The disc has a filling hole extending therethrough. A collar is designed for releasably attaching the disc to the open top end of the container.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
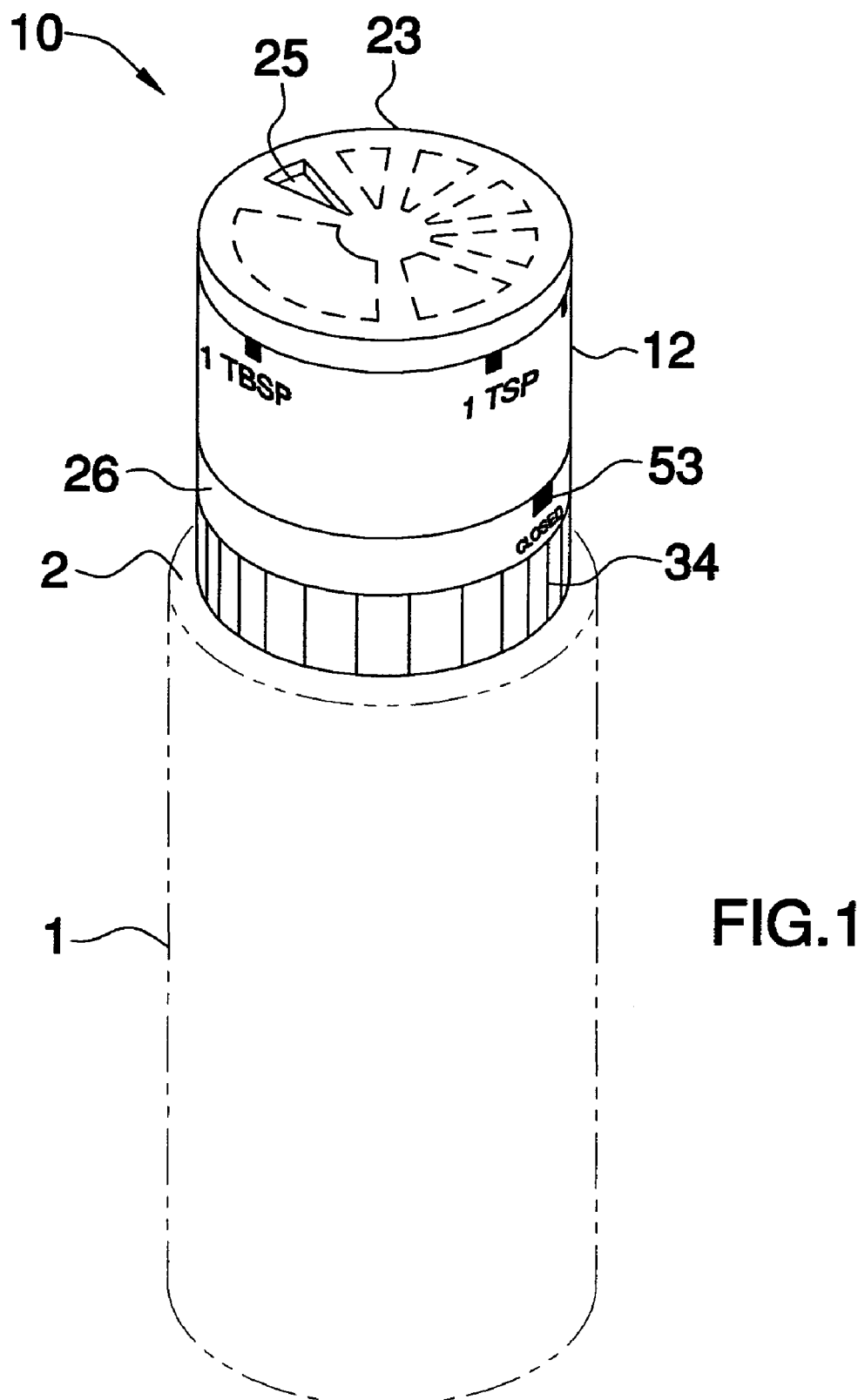
FIG. 1 is a view of a measuring dispenser coupled to the container according to the present invention.
Figure 2:
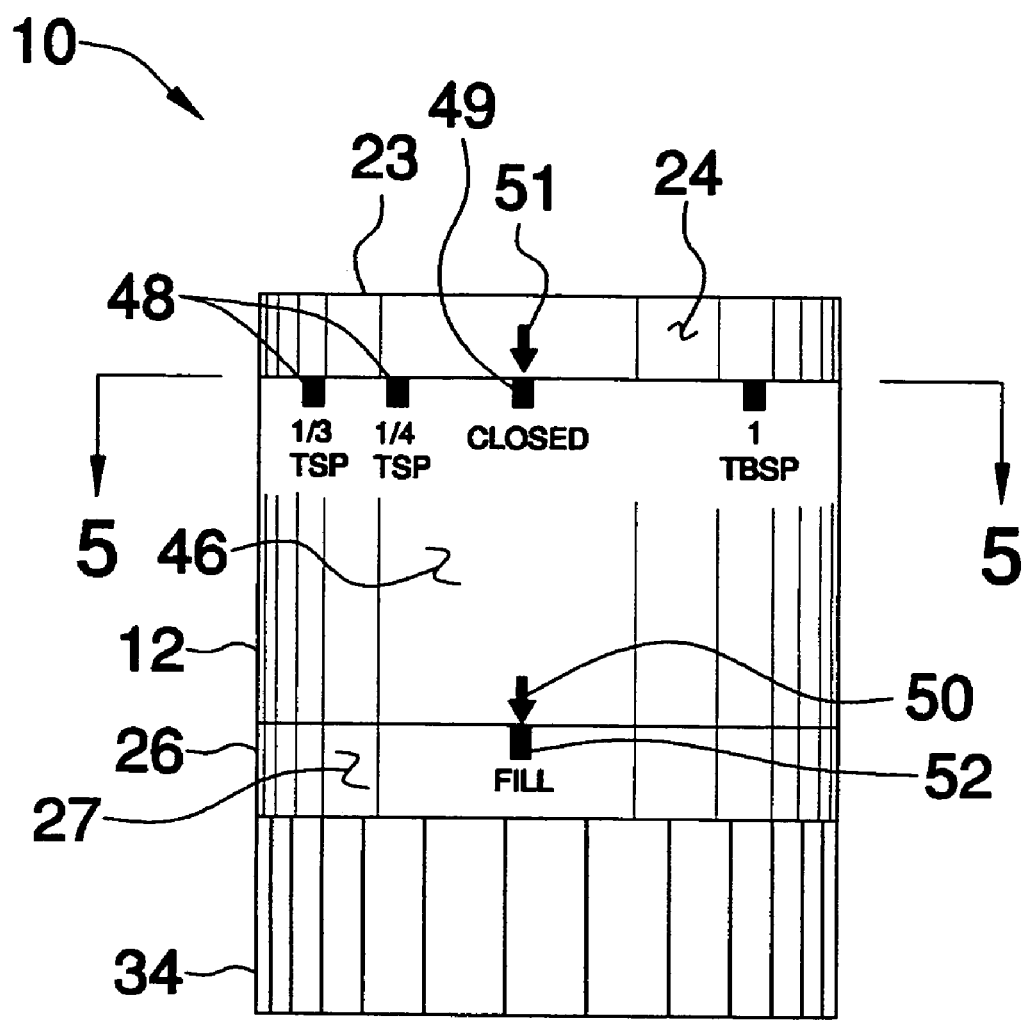
FIG. 2 is a side view of the present invention.
Figure 3:
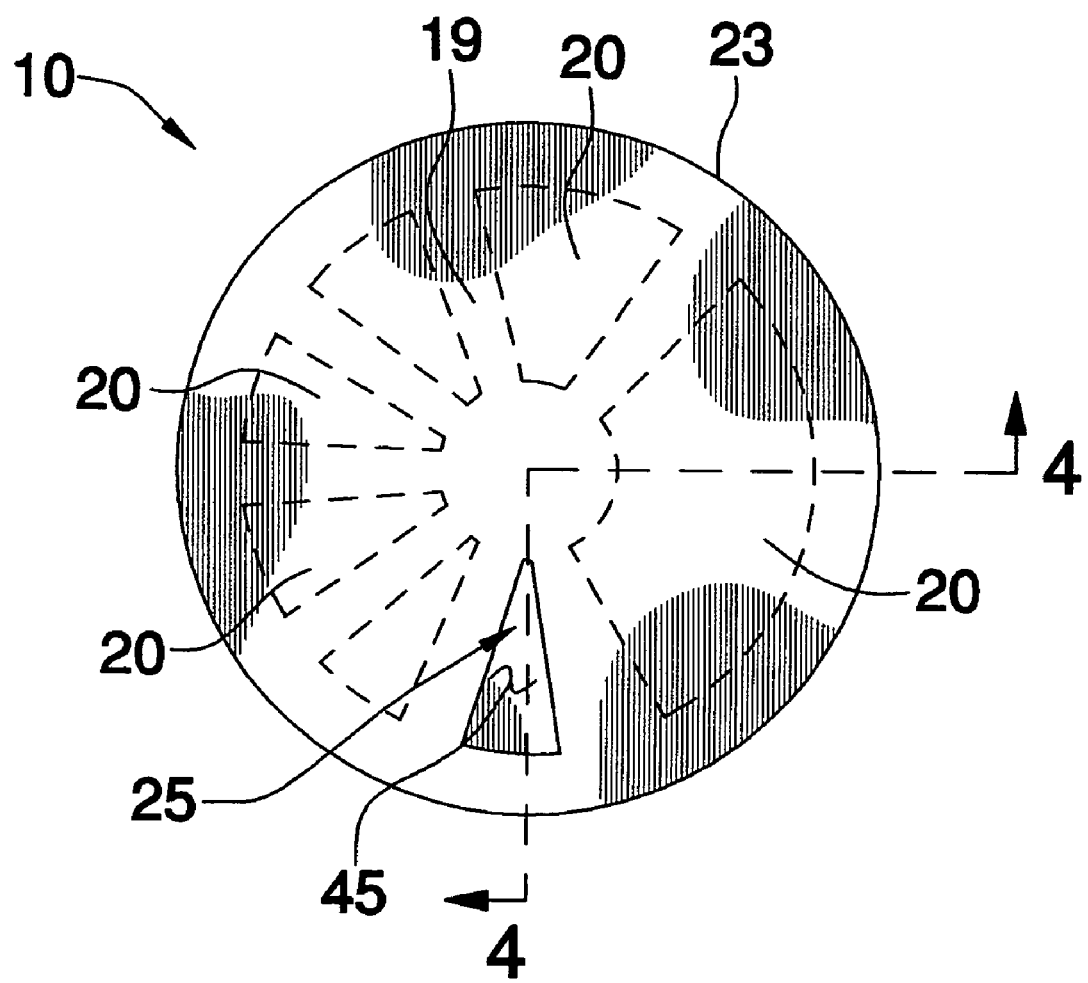
FIG. 3 is a top view of the present invention.
Figure 4:
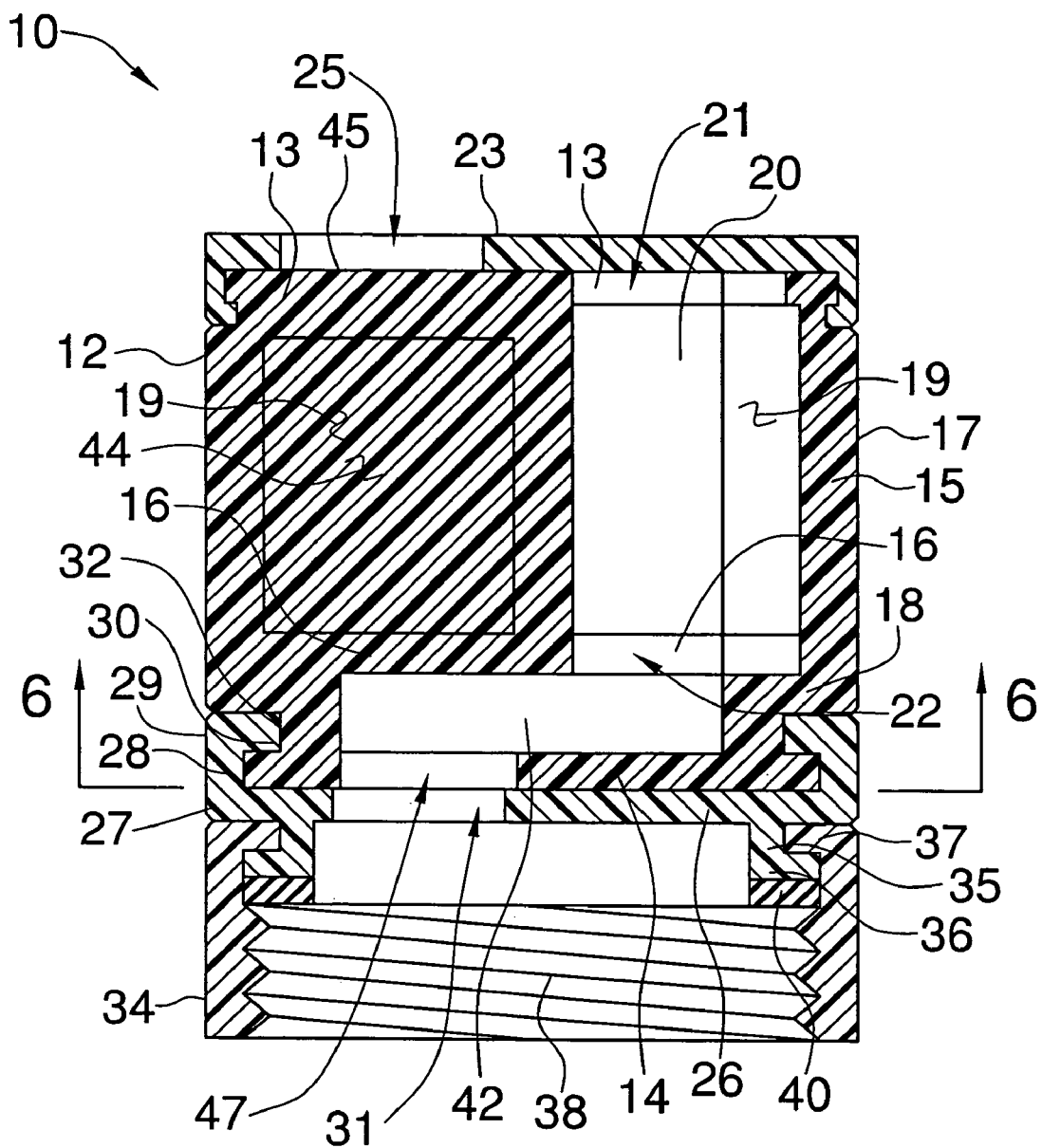
FIG. 4 is a cross-sectional view of the present invention taken along line 4—4 of FIG. 3.
Figure 5:
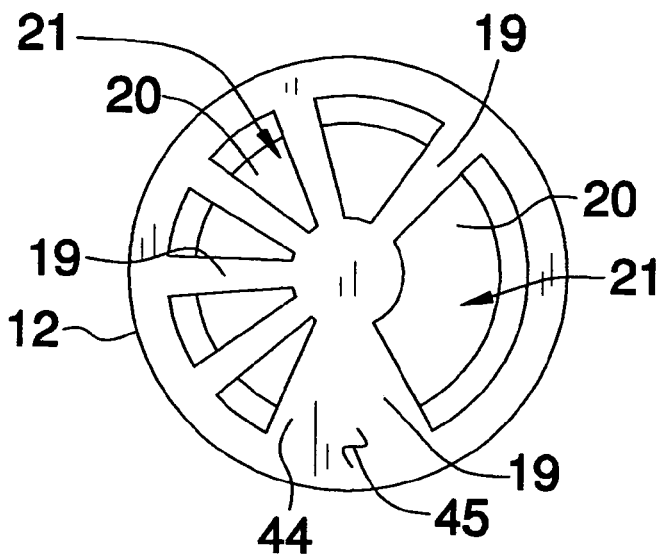
FIG. 5 is a top view of the housing of the present invention taken along line 5—5 of FIG. 2.
Figure 6:
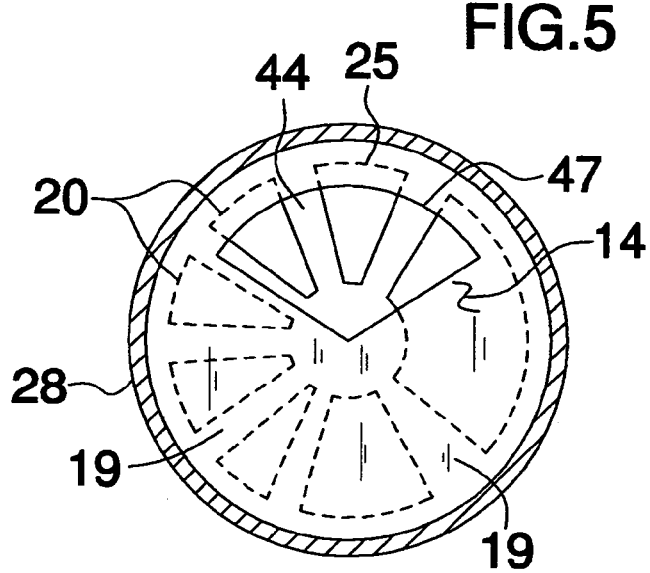
FIG. 6 is a cross-sectional view of the present invention taken along line 6—6 of FIG. 4.
Figure 7:
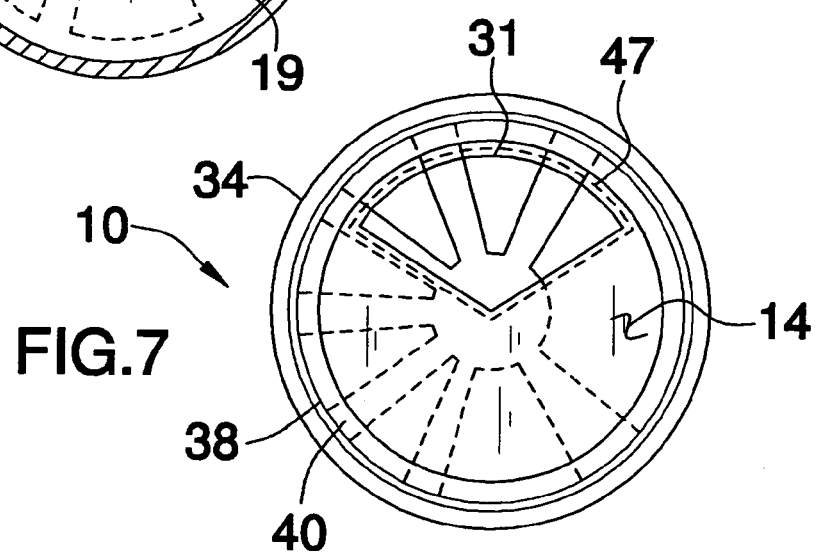
FIG. 7 is a bottom view of the present invention.

With reference now to the drawings, and in particular to FIGS. 1 through 7 thereof, a new dispenser embodying the principles and concepts of the present invention and generally designated by the reference numeral 10 will be described.

As best illustrated in FIGS. 1 through 7, the measuring and dispensing apparatus 10 is adapted for distributing measured amounts of a material from a container 1. The container 1 has a threaded open top end 2 to which the apparatus 10 may be removably attached.

The apparatus 10 generally comprises a cylindrical housing 12 with a top wall 13, a bottom wall 14, and a peripheral wall 15 that is attached to and extends between the top and bottom walls 13, 14. A partition wall 16 is positioned between the top and bottom walls 13, 14 for dividing the housing 12 into a top portion 17 and a bottom portion 18. A plurality of radial walls 19 are is attached to and extend between the top wall 13 and the partition wall 16 such that a plurality of cavities 20 are is defined in the top portion 17. Each of the cavities 20 extends through the top 13 and partition 16 walls so that a plurality of top openings 21 and bottom openings 22 is defined.

A cover member 23 is rotatably coupled to the top wall 13 of the housing 12 and covers each of the top openings 21. The cover member 23 has a dispensing hole 25 extending therethrough. Included is a disc 26 with a peripheral edge 27, and an upwardly extending lip 28 attached to and extending along the peripheral edge 27. The upwardly extending lip 28 has an outer edge 29 with an inwardly extending peripheral flange 30 attached thereto. The peripheral flange 30 is positioned within a peripheral groove 32 in the housing 12 such that the disc 26 is rotationally coupled to the housing 12. The disc 26 has a filling hole 31 extending therethrough.

A collar 34 designed for releasably attaching the disc 26 to the open top end 2 of the container 1 is attached to the disc 26. A downwardly extending lip 35 is attached to the disc 26 and has an outwardly extending flange 36 attached thereto. The outwardly extending flange 36 is interlocked with a shoulder 37 attached to and extending inwardly from the collar 34. An interior peripheral wall 38 of the collar 34 is threaded such that the collar 34 is threadably couplable to the top end 2 of the container 1.

A seal 40 is attached to the outwardly extending flange 36 of the disc 26 and is directed away from the housing 12 so that the seal 40 abuts the top end 2 of the container 1 when the collar 34 is threadably coupled to the container 1. A bottom space 42 is defined between the bottom wall 14 and the partition wall 16. Each of the cavities 20 is in fluid communication with the bottom space 42.

A first radial wall 44 of the radial walls 19 has a greater thickness than the remaining radial walls 19 and defines a closure section 45 of the top wall 13 of the housing 12. Each of the cavities 20 has a different volume with respect to each other. The dispensing hole 25 has a size less than the first radial wall 44 of the housing 12 so that each of the top openings 21 in the top wall 13 are covered when the dispensing hole 25 is aligned with the first radial wall 44. The dispensing hole 25 is selectively alignable with each one of the top openings 21.

A plurality of quantity indicia 48 is positioned on an outer surface 46 of the peripheral wall 15 of the housing 12. Each of the quantity indicia 48 is positioned adjacent to one of the cavities 20 and comprises a volume measurement indicative of a volume of an associated one of the cavities 20. A first closed indicator 49 is positioned on the outer surface 46 of the housing 12 and is located adjacent to the first radial wall 44. The bottom wall 14 has an opening 47 extending therethrough into the bottom space 42 of the housing 12. A first marking 50 is positioned on the outer surface 46 of the housing 12 and is aligned with the opening 47 in the bottom wall 14. A second marking 51 is positioned on a peripheral outer surface 46 of the cover member 23 and is designed for indicating a position of the dispensing hole 25 with respect to the plurality of quantity indicia 48 and the first closed indicator 49. The filling hole 31 is selectively positioned in an open position aligned with the opening 47 in the bottom wall 14, or in a closed position during which the disc 26 covers the opening 47 in the bottom wall 14.

A fill indicator 52 is positioned on the peripheral edge 27 of the disc 26 and is located adjacent to the filling hole 31. The fill indicator 52 is substantially aligned with the first marking 50 of the housing 12 when the filling hole 31 is in the open position. A second closed indicator 53 is positioned on the peripheral edge 27 of the disc 26 and is located opposite the fill indicator 52. The second closed indicator 53 is substantially aligned with the first marking 50 of the housing 12 when the filling hole 31 is in the closed position.

A fill configuration is defined when the filling hole 31 is in the open position and the second marking 51 is aligned with the first closed indicator 49 such the dispensing hole 25 is aligned with the closure section 45 of the top wall 13 and the container 1 is inverted. A dispensing configuration is defined when the filling hole 31 is in the closed position and the second marking 51 is aligned with one of the quantity indicators such that the dispensing hole 25 is aligned with one of the top openings 21 and the container 1 is inverted.

In use, the material is moved into the cavities 20 of the housing 12 when in the fill configuration as defined above. While the container 1 is still inverted, the disc 26 is rotated until it is indicated that the filling hole 31 is in the closed position, thereby maintaining the amount of material in each of the cavities 20. The container 1 is then returned to the upright position, the cover member 23 rotated until the dispensing hole 25 is aligned with the desired cavity 20. Alternate dispensing holes 25 may be used which utilize a plurality relatively small apertures so that he apparatus can be used as a shaker. The container 1 is then overturned to dispense the material from the selected cavity 20, thereby dispensing the desired amount of material.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A measuring and dispensing apparatus for distributing measured amounts of a material from a container having a threaded open top end to which said apparatus may be removably attached, said apparatus comprising:
   a housing having a top wall, a bottom wall, and a peripheral wall being attached to and extending between said top and bottom walls, a partition wall being positioned between said top and bottom walls for dividing said housing into a top portion and a bottom portion, a plurality of radial walls being attached to and extending between said top wall and said partition wall such that a plurality of cavities are defined in said top portion, each of said cavities extending upwardly through said top wall and downwardly through said partition wall such that a plurality of top openings and bottom openings are defined;
   a cover member being rotatably coupled to said top wall of said housing and covering each of said top openings, said cover member having a dispensing hole extending therethrough;
   a disc having a peripheral edge, an upwardly extending lip being attached to and extending along said peripheral edge, said upwardly extending lip having an outer edge having an inwardly extending peripheral flange attached thereto, said peripheral flange being positioned within a peripheral groove in said housing such that said disc is rotationally coupled to said housing, said disc having a filling hole extending therethrough; and
   a collar adapted for releasably attaching said disc to the open top end of the container.

2. The measuring and dispensing apparatus according to claim 1, wherein said collar is attached to said disc, a downwardly extending lip being attached to said disk and having an outwardly extending flange attached thereto, an interior peripheral wall of said collar member being threaded such that said collar member is threadably couplable to the top end of the container.

3. The measuring and dispensing apparatus according to claim 2, further including a seal being attached to said outwardly extending flange of said disc and being directed away from said housing such that said seal abuts the top end of the container when said collar is threadably coupled to the container.

4. The measuring and dispensing apparatus according to claim 1, wherein a bottom space is defined between said bottom wall and said partition wall, each of said cavities being in fluid communication with said bottom space.

5. The measuring and dispensing apparatus according to claim 4, wherein a first of said radial walls has a greater thickness than remaining ones of said radial walls and defines a closure section of said top wall of said housing, each of said cavities having a different volume with respect to each other.

6. The measuring and dispensing apparatus according to claim 5, further including a plurality of quantity indicia being positioned on an outer surface of said peripheral wall of said housing, each of said quantity indicia being positioned adjacent to one of said cavities and comprising a volume measurement indicative of a volume of an associated one of said cavities.

7. The measuring and dispensing apparatus according to claim 6, further including a first closed indicator being positioned on said outer surface of said housing and being located adjacent to said first radial wall of said housing.

8. The measuring and dispensing apparatus according to claim 6, wherein said bottom wall has an opening extending therethrough and into said bottom space of said bottom portion of said housing, a first marking being positioned on said outer surface of said housing and being aligned with said opening in said bottom wall.

9. The measuring and dispensing apparatus according to claim 5, wherein said dispensing hole has a size less than said first radial wall of said housing such that each of said top openings in said top wall are covered when said dispensing hole is aligned with said first radial wall.

10. The measuring and dispensing apparatus according to claim 1, wherein said dispensing hole in said cover member is selectively alignable with each one of said top openings.

11. The measuring and dispensing apparatus according to claim 7, further including a second marking being positioned on a peripheral outer surface of said cover member, said second marking being adapted for indicating a position of said dispensing hole with respect to said plurality of quantity indicia and said first closed indicator.

12. The measuring and dispensing apparatus according to claim 11, wherein said filling hole is selectively positioned in an open position aligned with said opening in said bottom wall, or in a closed position during which said disc covers said opening in said bottom wall.

13. The measuring and dispensing apparatus according to claim 2, wherein said outwardly extending flange is interlocked with a shoulder attached to and extending inwardly from said collar.

14. The measuring and dispensing apparatus according to claim 12, further including a fill indicator being positioned on said peripheral edge of said disc and being located adjacent to said filling hole, said fill indicator being substantially aligned with said first marking of said housing when said filling hole is in the open position.

15. The measuring and dispensing apparatus according to claim 14, further including a second closed indicator being positioned on said peripheral edge of said disc and being located opposite said fill indicator.

16. The measuring and dispensing apparatus according to claim 15, wherein said second closed indicator is substantially aligned with said first marking of said housing when said filling hole is in the closed position.

17. The measuring and dispensing apparatus according to claim 12, wherein a fill configuration is defined when said filling hole is in the open position and said second marking is aligned with said first closed indicator such said dispensing hole is aligned with said closure section of said top wall and the container is inverted.

18. The measuring and dispensing apparatus according to claim 12, wherein a dispensing configuration is defined when said filling hole is in the closed position and said second marking is aligned with one of said quantity indicators such that said dispensing hole is aligned with one of said top openings and the container is inverted.

19. A measuring and dispensing apparatus for distributing measured amounts of a material from a container having a threaded open top end to which said apparatus may be removably attached, said apparatus comprising:

a cylindrical housing having a top wall, a bottom wall, and a peripheral wall being attached to and extending between said top and bottom walls, a partition wall being positioned between said top and bottom walls for dividing said housing into a top portion and a bottom portion, wherein a bottom space is defined between said bottom wall and said partition wall, a plurality of radial walls being attached to and extending between said top wall and said partition wall such that a plurality of cavities are defined in said top portion, each of said cavities extending upwardly through said top wall and downwardly through said partition wall such that a plurality of top openings and bottom openings are defined at respective ends of each of said cavities, each of said cavities being in fluid communication with said bottom space, a first of said radial walls having a greater thickness than remaining ones of said radial walls and defining a closure section of said top wall of said housing, each of said cavities having a different volume with respect to each other, said bottom wall having an opening extending therethrough and into said bottom space of said bottom portion of said housing, a plurality of quantity indicia being positioned on an outer surface of said peripheral wall, each of said quantity indicia being positioned adjacent to one of said cavities and comprising a volume measurement indicative of a volume of an associated one of said cavities, a first closed indicator being positioned on said outer surface of said housing and being located adjacent to said first radial wall of said housing, a first marking being positioned on said outer surface of said housing and being aligned with said opening in said bottom wall;

a cover member being rotatably coupled to said top wall of said housing and covering each of said top openings, said cover member having a dispensing hole extending therethrough, said dispensing hole having a size less than said first radial wall of said housing such that each of said top openings in said top wall are covered when said dispensing hole is aligned with said first radial wall, said dispensing hole in said cover member being selectively alignable with each one of said top openings, a second marking being positioned on a peripheral outer surface of said cover member, said second marking being adapted for indicating a position of said dispensing hole with respect to said plurality of quantity indicia and said first closed indicator;

a disc having a peripheral edge and an upwardly extending lip being attached to and extending along said peripheral edge, said upwardly extending lip having an outer edge having an inwardly extending peripheral flange attached thereto, said flange being positioned within a peripheral groove in said housing such that said disc is rotationally coupled to said housing, said disc having a filling hole extending therethrough, said filling hole being selectively positioned in an open position aligned with said opening in said bottom wall or in a closed position wherein said disc covers said opening in said bottom wall;

a collar adapted for releasably attaching said disc to the open top end of the container, said collar being attached to said disc, an interior peripheral wall of said collar member being threaded such that said collar member is threadably couplable to the top end of the container, a downwardly extending lip being attached to said disk and having an outwardly extending flange attached thereto, said outwardly extending flange being interlocked with a shoulder attached to and extending inwardly from said collar;

a seal being attached to said outwardly extending flange of said disc and being directed away from said housing such that said seal abuts the top end of the container when said collar is threadably coupled to the container;

a fill indicator being positioned on said peripheral edge of said disc and being located adjacent to said filling hole, said fill indicator being substantially aligned with said first marking of said housing when said filling hole is in the open position, a second closed indicator being positioned on said peripheral edge of said disc and being located opposite said fill indicator, said second closed indicator being substantially aligned with said first marking of said housing when said filling hole is in the closed position;

wherein a fill configuration is defined when said filling hole is in the open position and said second marking is aligned with said first closed indicator such said dispensing hole is aligned with said closure section of said top wall and the container is inverted; and wherein a dispensing configuration is defined when said filling hole is in the closed position and said second marking is aligned with one of said quantity indicators such that said dispensing hole is aligned with one of said top openings and the container is inverted.

* * * * *